Dec. 9, 1924.  1,518,977
E. C. FORREST
COMBINED HANDSAW, BEVEL, AND SQUARE
Filed May 19, 1923
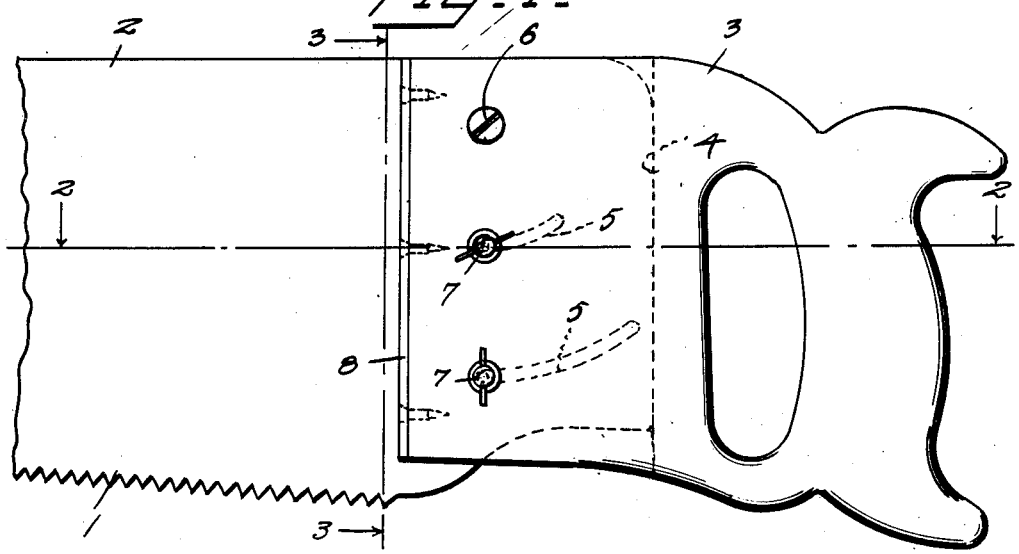
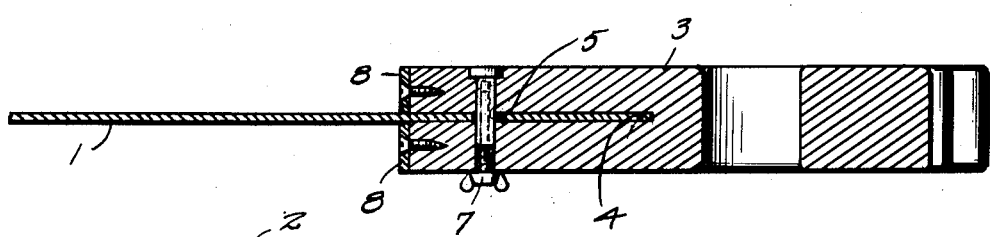
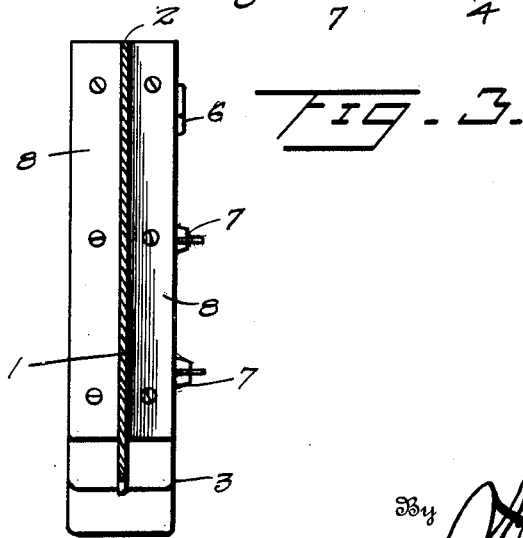
Inventor
E. C. Forrest Patented Dec. 9, 1924.

1,518,977

UNITED STATES PATENT OFFICE.

EDWIN C. FORREST, OF YONKERS, NEW YORK.

COMBINED HANDSAW, BEVEL, AND SQUARE.

Application filed May 19, 1923. Serial No. 640,158.

*To all whom it may concern:*

Be it known that I, EDWIN C. FORREST, a citizen of the United States, residing at Yonkers, in the county of Westchester and State of New York, have invented certain new and useful Improvements in Combined Handsaws, Bevels, and Squares; and I do hereby declare the following to be a full, clear, and exact description of the invention, such as will enable others skilled in the art to which it appertains to make and use the same.

The invention has for its object the provision of a handsaw which also may be used as a bevel and square, the handle being adjustable relatively to the saw blade and adapted to be secured in the required adjusted position.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of the handle portion of a handsaw embodying the invention, Fig. 2 is a sectional view on the line 2—2 of Fig. 1, and Fig. 3 is a detail sectional view on the line 3—3 of Fig. 1.

Corresponding and like parts are referred to in the following description and designated in the several views of the drawings by like reference characters.

The numeral 1 designates a saw blade such as generally provided for a carpenter's handsaw; and in accordance with the present invention, the back of the saw is straight, as indicated at 2, to be used as a ruler when drawing straight lines. The numeral 3 designates a handle such as generally applied to the inner or rear end of the saw blade 1; and in accordance with the present invention, the handle is relatively adjustable to the blade to admit of the saw being used either as a square or bevel. The inner or forward end of the handle 3 is provided with the usual kerf or saw-cut 4 to receive the inner or rear end of the blade 1, and provision is had for relative angular adjustment of the blade whereby to use the saw in either capacity stated. In accordance with the present invention, arcuate slots 5 are formed in the rear end of the blade 1 and these slots are concentric with a pivot 6 about which the blade 1 is adapted to turn. Thumb-bolts 7 pass through openings formed in the handle 3 and operate in the arcuate slots 5. The blade 1 may be secured to the handle 3 in the required adjusted position by tightening the thumbnuts of the bolts 7. Wear plates 8 are attached to the inner end of the handle 3 upon opposite sides of the kerf or saw-cut 4.

It will be understood from the foregoing that the invention results in the provision of a handsaw which may be readily used as a square or bevel, and when adapted for use as a square the handle 3 is adjusted so that the plates 8 at the inner end thereof are at a right angle to the back 2 of the blade 1 and when adjusted for use as a bevel, the blade 1 is adjusted with reference to the handle 3 so that the back 2 of the saw blade may be disposed at different angles to the reinforced inner end of the handle 3. The pivot fastening 6 may be of any preferred construction.

What is claimed is:

1. A handsaw comprising a saw blade having its back edge straight and provided with a pivot opening, an arcuate slot concentric with the pivot opening, a handle having a kerf to receive the inner or rear end of the saw blade and having its forward edge straight and adapted to be angularly disposed with respect to the back of the saw blade to afford a bevel, wear plates attached to the forward end of the handle upon opposite sides of the kerf, and fastening means passing through the handle and the pivot opening and arcuate slot of the saw blade whereby to secure the latter in the required adjusted position.

2. A handsaw having a blade member provided with a straight back edge, a handle member for the blade member and pivoted thereto, said blade member having arcuate slots, fastening means passing through said handle member and through said slots, the forward edge of the handle being straight, the fastenings and arcuate slots enabling the said back edge and forward edge to be disposed at different angles to afford a bevel.

In testimony whereof I affix my signature in presence of two witnesses.

EDWIN C. FORREST.

Witnesses:
ALBERT HALEK,
JAMES E. PATTERSON.